US012666122B2

(12) United States Patent
An

(10) Patent No.: US 12,666,122 B2
(45) Date of Patent: Jun. 23, 2026

(54) VEHICLE AND METHOD OF CONTROLLING THE SAME

(71) Applicants:Hyundai Motor Company, Seoul (KR); Kia Corporation, Seoul (KR)

(72) Inventor: Dae Hwi An, Hwaseong-si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 0 days.

(21) Appl. No.: 19/171,771

(22) Filed: Apr. 7, 2025

(65) Prior Publication Data

US 2026/0082111 A1     Mar. 19, 2026

(30) Foreign Application Priority Data

Sep. 13, 2024     (KR) ........................ 10-2024-0125239

(51) Int. Cl.
*H04N 21/8549* (2011.01)
*H04N 21/266* (2011.01)
*H04N 21/414* (2011.01)
*H04N 21/433* (2011.01)
*H04N 21/442* (2011.01)

(52) U.S. Cl.
CPC ....... *H04N 21/8549* (2013.01); *H04N 21/266* (2013.01); *H04N 21/41422* (2013.01); *H04N 21/433* (2013.01); *H04N 21/442* (2013.01)

(58) Field of Classification Search
CPC ............. H04N 21/8549; H04N 21/266; H04N 21/41422; H04N 21/433; H04N 21/442
See application file for complete search history.

(56) References Cited

U.S. PATENT DOCUMENTS

| | | | |
|---|---|---|---|
| 2016/0165174 A1* | 6/2016 | Nishimura | H04N 21/41422 386/248 |
| 2017/0097857 A1* | 4/2017 | Yang | G06F 11/3024 |
| 2018/0270542 A1* | 9/2018 | Ramalingam | B60W 50/14 |
| 2020/0177967 A1* | 6/2020 | Rakshit | H04N 21/4852 |
| 2024/0002007 A1* | 1/2024 | Zhan | B62J 50/22 |

FOREIGN PATENT DOCUMENTS

KR     10-2010-0003577 A     1/2010

* cited by examiner

*Primary Examiner* — Oschta I Montoya
(74) *Attorney, Agent, or Firm* — MORGAN, LEWIS & BOCKIUS LLP

(57)     ABSTRACT

A vehicle includes a transceiver configured to perform communication with a first server, a display configured to output at least one of a video signal and an audio signal of video content, and a processor configured to determine whether a vehicle travels, receive one or more highlight videos corresponding to a first period in which the vehicle was in a traveling state from the first server, and control the display to play the highlight video during a second period in which the vehicle is in a stopped state.

16 Claims, 8 Drawing Sheets

Figure 8:
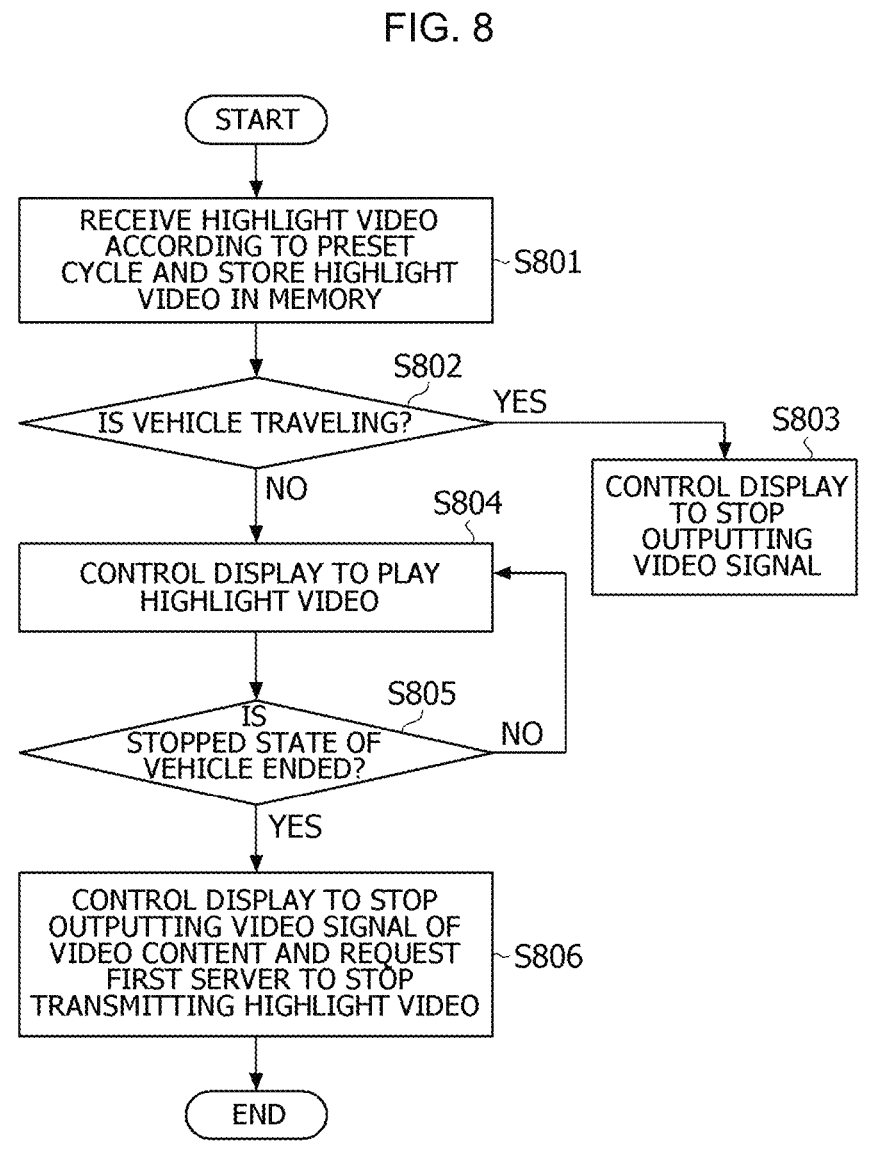

START

RECEIVE HIGHLIGHT VIDEO ACCORDING TO PRESET CYCLE AND STORE HIGHLIGHT VIDEO IN MEMORY   S801

IS VEHICLE TRAVELING?   S802

YES

CONTROL DISPLAY TO STOP OUTPUTTING VIDEO SIGNAL   S803

NO

CONTROL DISPLAY TO PLAY HIGHLIGHT VIDEO   S804

IS STOPPED STATE OF VEHICLE ENDED?   S805

NO

YES

CONTROL DISPLAY TO STOP OUTPUTTING VIDEO SIGNAL OF VIDEO CONTENT AND REQUEST FIRST SERVER TO STOP TRANSMITTING HIGHLIGHT VIDEO   S806

END

FIG. 9

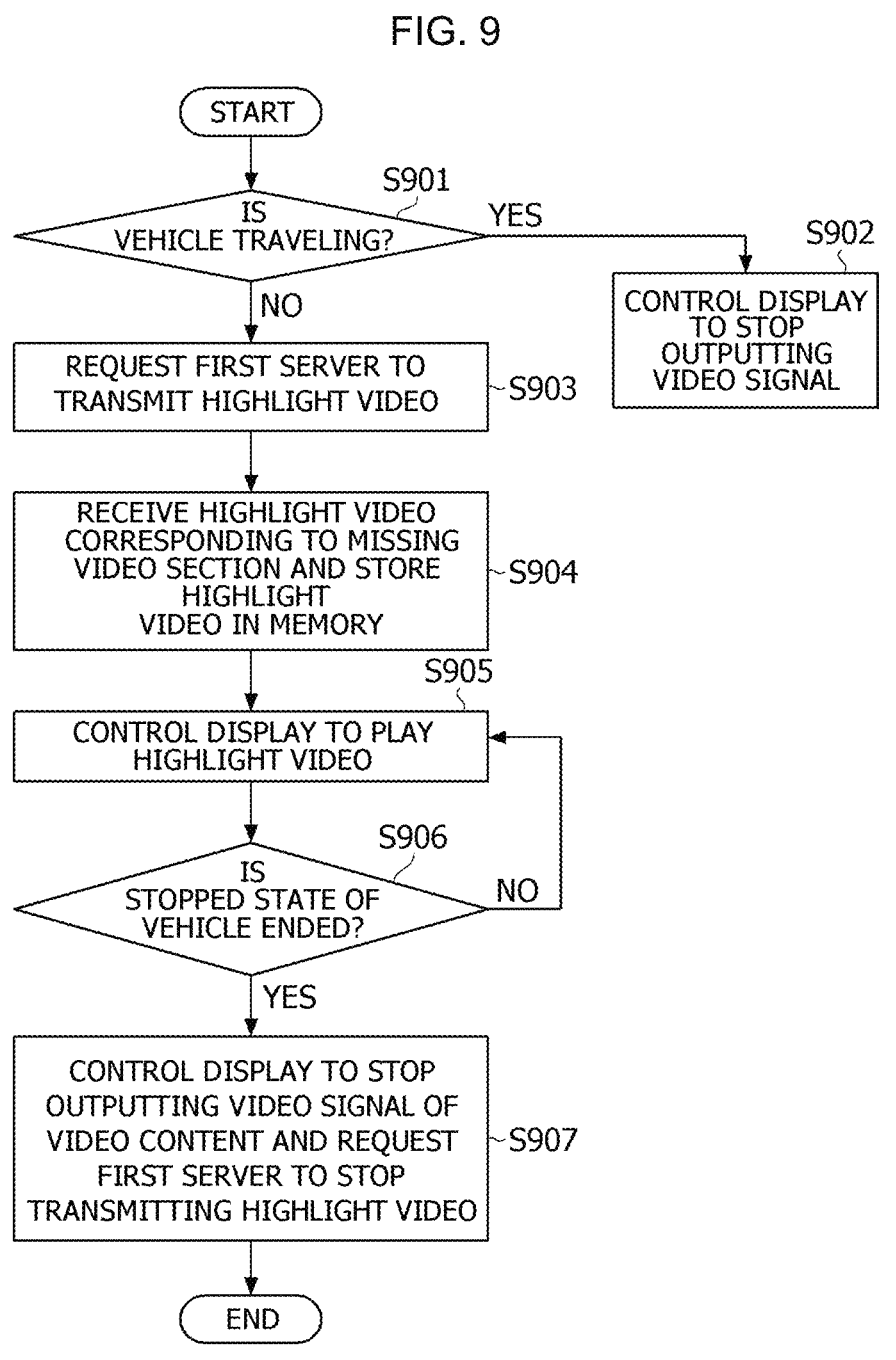

START

S901

IS VEHICLE TRAVELING?

YES → S902

CONTROL DISPLAY TO STOP OUTPUTTING VIDEO SIGNAL

NO

REQUEST FIRST SERVER TO TRANSMIT HIGHLIGHT VIDEO — S903

RECEIVE HIGHLIGHT VIDEO CORRESPONDING TO MISSING VIDEO SECTION AND STORE HIGHLIGHT VIDEO IN MEMORY — S904

S905

CONTROL DISPLAY TO PLAY HIGHLIGHT VIDEO

S906

IS STOPPED STATE OF VEHICLE ENDED?

NO

YES

CONTROL DISPLAY TO STOP OUTPUTTING VIDEO SIGNAL OF VIDEO CONTENT AND REQUEST FIRST SERVER TO STOP TRANSMITTING HIGHLIGHT VIDEO — S907

END

FIG. 10

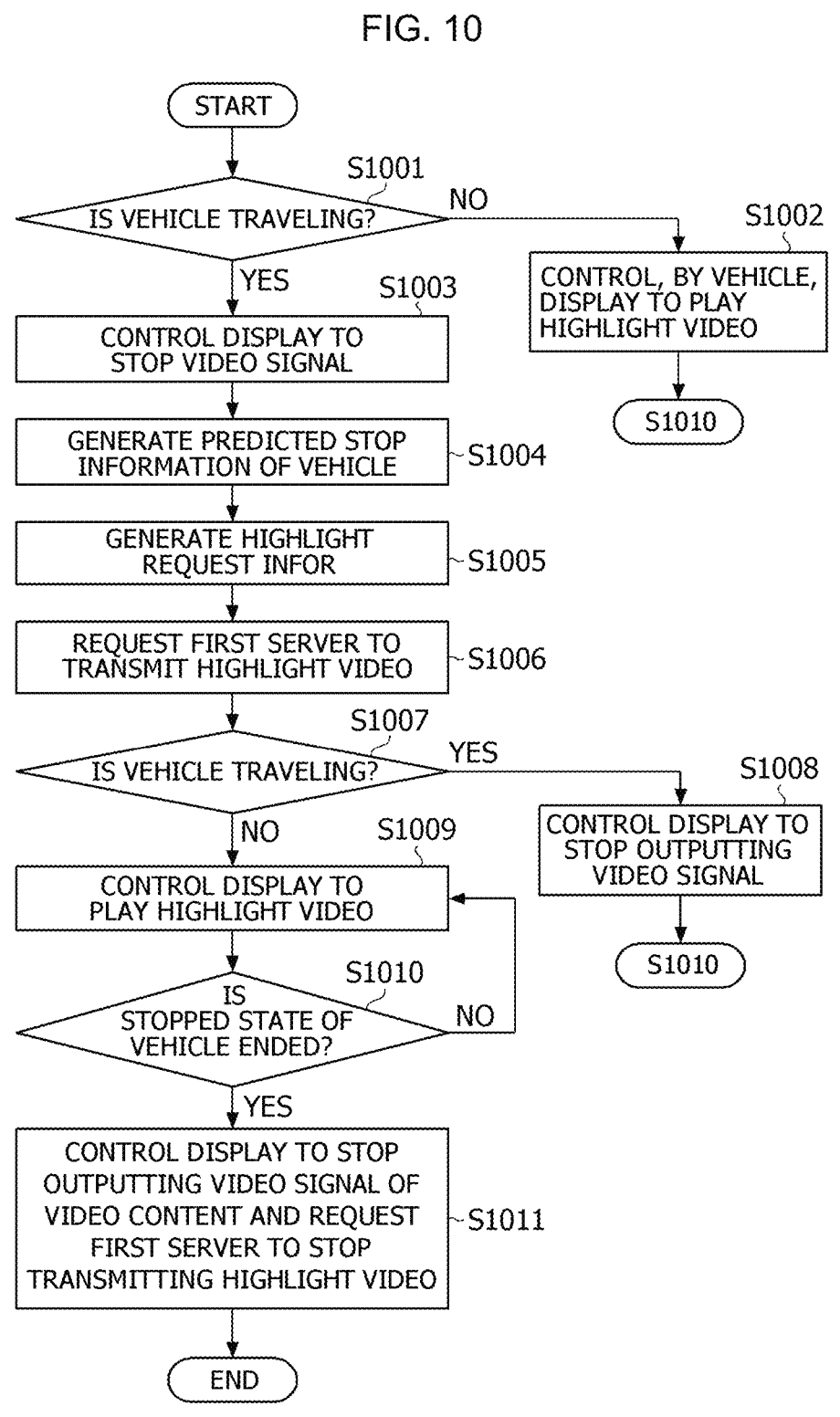

START

S1001
IS VEHICLE TRAVELING? — NO →

S1002
CONTROL, BY VEHICLE, DISPLAY TO PLAY HIGHLIGHT VIDEO

↓ YES

S1003
CONTROL DISPLAY TO STOP VIDEO SIGNAL

S1004
GENERATE PREDICTED STOP INFORMATION OF VEHICLE

S1005
GENERATE HIGHLIGHT REQUEST INFOR

S1006
REQUEST FIRST SERVER TO TRANSMIT HIGHLIGHT VIDEO

S1007
IS VEHICLE TRAVELING? — YES →

S1008
CONTROL DISPLAY TO STOP OUTPUTTING VIDEO SIGNAL

↓ NO

S1009
CONTROL DISPLAY TO PLAY HIGHLIGHT VIDEO

S1010
IS STOPPED STATE OF VEHICLE ENDED? — NO → (loops back to S1009)

↓ YES

S1011
CONTROL DISPLAY TO STOP OUTPUTTING VIDEO SIGNAL OF VIDEO CONTENT AND REQUEST FIRST SERVER TO STOP TRANSMITTING HIGHLIGHT VIDEO

S1010 (from S1002)
S1010 (from S1008)

END

1

VEHICLE AND METHOD OF CONTROLLING THE SAME

CROSS-REFERENCE TO RELATED APPLICATION

The present application claims priority to Korean Patent Application No. 10-2024-0125239, filed on Sep. 13, 2024, the entire contents of which is incorporated herein for all purposes by this reference.

BACKGROUND OF THE PRESENT DISCLOSURE

Field of the Present Disclosure

The present disclosure relates to a vehicle and a method for controlling the same.

Description of Related Art

Behaviors of playing and watching a video while driving a vehicle can cause a driver distraction, greatly affecting safety. Therefore, in many countries and regions, the playing of the video at a position at which the driver can see the video while driving is prohibited by law.

Therefore, there is a problem that a vehicle driver has difficulty in continuously watching video content because the video content is temporarily stopped while driving.

Furthermore, although platforms that support video streaming services in vehicles have been developed and applied recently, there is a limitation that a driver while driving cannot normally receive such a video streaming service.

The information included in this Background of the present disclosure is only for enhancement of understanding of the general background of the present disclosure and may not be taken as an acknowledgement or any form of suggestion that this information forms the prior art already known to a person skilled in the art.

BRIEF SUMMARY

Various aspects of the present disclosure are directed to providing a vehicle and a method for controlling the same, using which a driver's satisfaction with watching videos while driving while satisfying legal regulations may be increased.

Furthermore, the present disclosure is directed to providing a vehicle and a method for controlling the same, using which a driver's satisfaction with watching videos while driving may be increased in addition to securing the vehicle driver's safety.

According to an exemplary embodiment of the present disclosure, there is provided a vehicle including a transceiver configured to perform communication with a first server, a display configured to output at least one of a video signal and an audio signal of video content, and a processor configured to determine whether the vehicle travels, receive one or more highlight videos corresponding to a first period in which the vehicle was in a traveling state from the first server, and control the display to play the highlight videos during a second period in which the vehicle is in a stopped state.

The processor is configured for controlling the display to stop outputting the video signal of the video content during the first period when the vehicle is traveling and to play the video signal and the audio signal of the highlight video during the second period in which the vehicle is stopped.

The transceiver may receive the highlight video from the first server according to a preset cycle and store the highlight video in a memory.

The transceiver may receive the highlight video from the first server at a time point when the vehicle is stopped according to a request of the processor and store the highlight video in a memory.

The processor is configured to generate predicted stop information including a predicted stop point, a predicted stop start time, and a predicted stop end time of the vehicle using traveling information and traffic situation information of the vehicle.

The processor is configured to generate highlight request information including the predicted stop information and missing video section information during the first period.

The transceiver may receive the highlight video corresponding to the highlight request information from the first server and store the highlight video in a memory.

The processor is configured for controlling the display to sequentially play the highlight video stored in a memory in time order.

The processor is configured for controlling the display to sequentially play the highlight video stored in a memory in order of higher priority.

The processor may set the priority according to at least one of popularity, preference, and playing time of the highlight video.

The transceiver may transmit traveling information of the vehicle to a second server and receive predicted stop information including a predicted stop point, a predicted stop start time, and a predicted stop end time of the vehicle that are determined using the traveling information and traffic situation information from the second server.

There is a method for controlling a vehicle, which includes determining, by a processor, whether a vehicle travels, and controlling, by the processor a display to play one or more highlight videos corresponding to a first period in which the vehicle was in a traveling state during a second period in which the vehicle is in a stopped state when the vehicle is stopped.

The method may further include controlling, by the processor, the display to stop outputting a video signal of video content when the vehicle is traveling.

The method may further include, before the determining of whether the vehicle travels, receiving, by a transceiver, the highlight video from a first server according to a preset cycle and storing the highlight video in a memory.

The method may further include, after the determining of whether the vehicle travels, receiving, by a transceiver, the highlight video from the first server at a time point when the vehicle is stopped according to a request of the processor and storing the highlight video in a memory.

The determining of whether the vehicle travels may further include generating, by the processor, predicted stop information including a predicted stop point, a predicted stop start time, and a predicted stop end time of the vehicle using traveling information and traffic situation information of the vehicle.

The determining of whether the travels may further include generating, by the processor, highlight request information including the predicted stop information and missing video section information during the first period.

The method may further include, after the determining of whether the vehicle travels, receiving, by a transceiver, the highlight video from the first server at a time point when the vehicle is stopped according to the request of the processor and storing the highlight video in a memory.

The controlling of the display may include controlling, by the processor, the display to sequentially play the highlight videos stored in a memory in time order.

The controlling of the display may include controlling, by the processor, the display to sequentially play the highlight videos stored in a memory in order of higher priority.

The methods and apparatuses of the present disclosure have other features and advantages which will be apparent from or are set forth in more detail in the accompanying drawings, which are incorporated herein, and the following Detailed Description, which together serve to explain certain principles of the present disclosure.

BRIEF DESCRIPTION OF THE DRAWINGS

FIG. 1 is a view showing a vehicle communicating with other devices to transmit and receive data;

FIG. 8, FIG. 9 and FIG. 10 are flowcharts of a method for controlling a vehicle according to an exemplary embodiment of the present disclosure.

Figure 2:
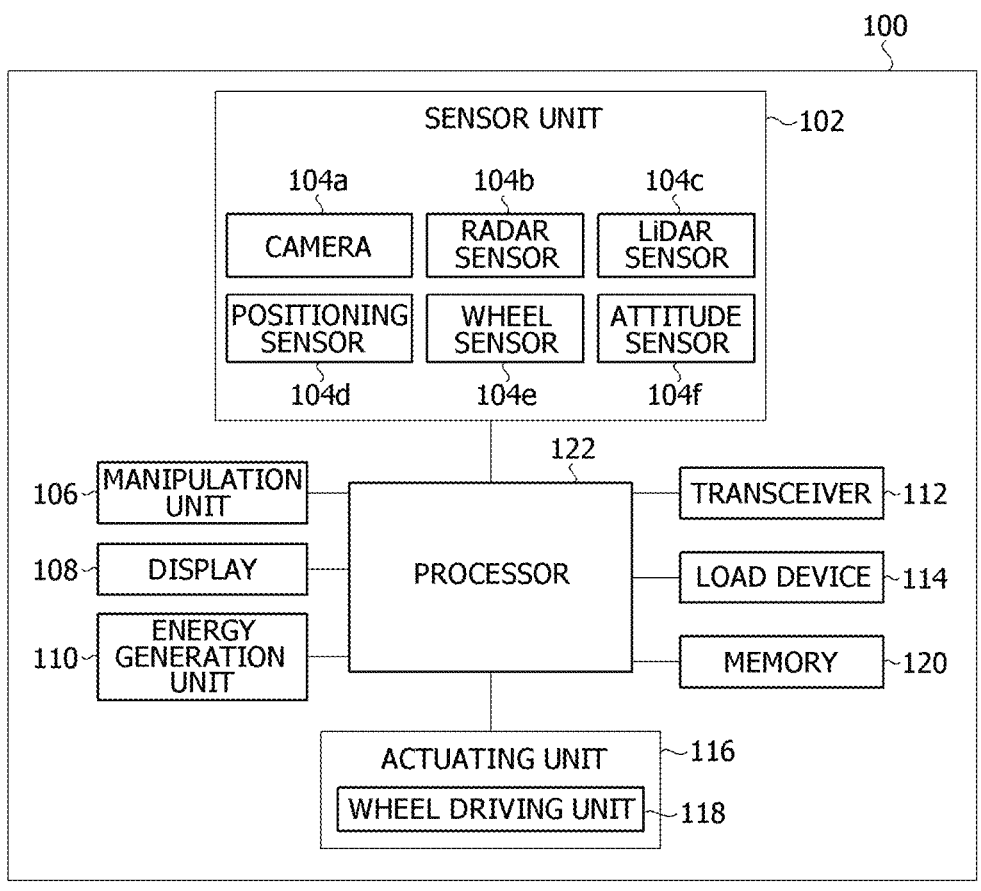
FIG. 2 is a view showing modules forming a vehicle according to an exemplary embodiment of the present disclosure.

It may be understood that the appended drawings are not necessarily to scale, presenting a somewhat simplified representation of various features illustrative of the basic principles of the present disclosure. The specific design features of the present disclosure as included herein, including, for example, specific dimensions, orientations, locations, and shapes will be determined in part by the particularly intended application and use environment.

In the figures, reference numbers refer to the same or equivalent portions of the present disclosure throughout the several figures of the drawing.

DETAILED DESCRIPTION

Reference will now be made in detail to various embodiments of the present disclosure(s), examples of which are illustrated in the accompanying drawings and described below. While the present disclosure(s) will be described in conjunction with exemplary embodiments of the present disclosure, it will be understood that the present description is not intended to limit the present disclosure(s) to those exemplary embodiments of the present disclosure. On the other hand, the present disclosure(s) is/are intended to cover not only the exemplary embodiments of the present disclosure, but also various alternatives, modifications, equivalents and other embodiments, which may be included within the spirit and scope of the present disclosure as defined by the appended claims.

Hereinafter, various exemplary embodiments of the present disclosure will be described in detail with reference to the accompanying drawings.

However, the technical spirit of the present disclosure is not limited to some of the described embodiments, but may be implemented in various different forms, and at least one of the components among the exemplary embodiments of the present disclosure may be used by being selectively coupled or substituted without departing from the scope of the technical spirit of the present disclosure.

Furthermore, terms (including technical and scientific terms) used in embodiments of the present disclosure may be construed as meaning which may be generally understood by those skilled in the art to which an exemplary embodiment of the present disclosure pertains unless explicitly specifically defined and described, and the meanings of the commonly used terms, such as terms defined in a dictionary, may be construed based on contextual meanings of related technologies.

Furthermore, the terms used in the exemplary embodiments of the present disclosure are for describing the exemplary embodiments and are not intended to limit the present disclosure.

In the specification, a singular form may include a plural form unless otherwise specified in the phrase, and when described as "at least one (or one or more) of A, B, and C," one or more among all possible combinations of A, B, and C may be included.

Furthermore, terms such as first, second, A, B, (a), and (b) may be used to describe components of the exemplary embodiments of the present disclosure.

These terms are only for distinguishing one component from another component, and the nature, sequence, order, or the like of the corresponding components is not limited by these terms.

Furthermore, when a first component is described as being "connected," "coupled," or "joined" to a second component, it may include a case in which the first component is directly connected, coupled, or joined to the second component, but also a case in which the first component is "connected," "coupled," or "joined" to the second component by other components present between the first component and the second component.

Furthermore, when the first component is described as being formed or disposed on "on (above) or below (under)" the second component, "on (above)" or "below (under)" may include not only a case in which two components are in direct contact with each other, but also a case in which one or more third components are formed or disposed between the two components. Furthermore, when described as "on (above) or below (under)," it may include the meaning of not only an upward direction but also a downward direction based on one component.

Hereinafter, various exemplary embodiments will be described in detail with reference to the accompanying drawings, and the same or corresponding components are denoted by the same reference numeral regardless of the reference numerals, and overlapping descriptions thereof will be omitted.

Figure 1:
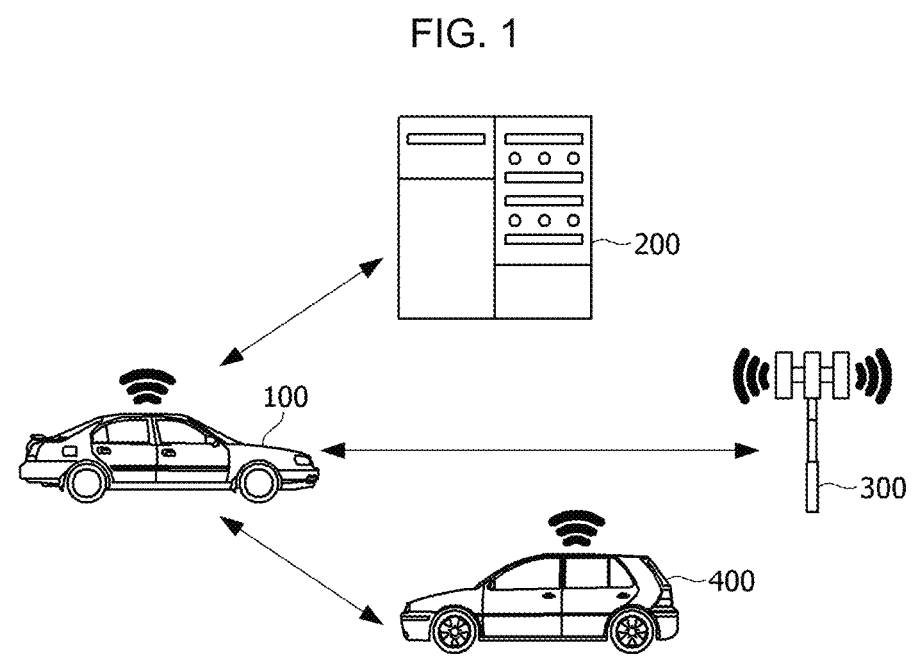

FIG. 1 is a view showing a vehicle communicating with other devices to transmit and receive data.

Referring to FIG. 1, a vehicle 100 may be driven based on electrical energy or fossil energy. In the case of electrical energy, the vehicle 100 may be, for example, a pure battery-based vehicle driven by only a high-voltage battery or may adopt a gas-based fuel cell as an energy source. Furthermore, a fuel cell may use any form of gas that may generate electrical energy, and the gas may fill the vehicle 100, for example, in a liquefied state. Here, the gas may be, for example, hydrogen. However, the present disclosure is not limited thereto, and any gas may be applied. In the case of fossil energy, the vehicle 100 may be driven based on fuel such as gasoline, diesel, or liquefied gas and provided with an internal combustion engine that drives an actuating unit 116 by combustion of the fuel. The engine may be included in an energy generation unit 110 from the perspective of providing a driving rotation force of a wheel to a wheel driving unit 118. As an exemplary embodiment of the present disclosure, the vehicle 100 may drive the actuating unit 116 selectively using an internal combustion engine based on fossil energy and the energy of an electric battery and may be a hybrid-type vehicle.

The vehicle 100 may refer to a mobile device. The vehicle 100 is a ground vehicle that travels on the ground and may be a typical passenger or commercial vehicle, a purpose built vehicle (PBV), etc. The vehicle 100 may be a four-wheeled vehicle, for example, a passenger vehicle, an SUV, a small truck, or a vehicle with more than four wheels, for example, a bus, a large truck, a container transport vehicle, a heavy equipment vehicle, or the like. Here, the ground vehicle may be referred to as including not only a vehicle that moves on land but also a vehicle that moves underground. The vehicle 100 may be a robot in a broad sense, such as a means of transportation, and the robot may be moved using wheels, tracks, or other moving modules. In an exemplary embodiment of the present disclosure, a ground mobility device such as a ground vehicle is mainly described, but unless it contradicts the present disclosure, the exemplary embodiment of the present disclosure may also be applied to air mobility devices, such as an advanced air mobility (AAM) and an aircraft, and water mobility devices, such as a ship and a submarine.

The vehicle 100 may be driven by being controlled in an autonomous manner, and the autonomous driving may be implemented as semi-autonomous driving or fully autonomous driving. The fully autonomous driving may be provided as autonomous movement in which a processor 122 of the vehicle 100 has full control without user intervention even when a traveling situation is uncertain. The semi-autonomous driving may be provided as autonomous movement that requires driver intervention depending on a specific traveling situation. The semi-autonomous driving may be implemented so that manual driving is performed by a user after deactivating autonomous driving in the case of the above situation and transferring control authority to the user. According to the level of the autonomous driving defined by the Society of Automotive Engineers (SAE), the semi-autonomous driving corresponds to autonomous driving levels 1 to 4, and the fully autonomous driving corresponds to level 5.

Meanwhile, the vehicle 100 may communicate with other devices 200 and 300 or another vehicle 400. The other devices may include, for example, a server 200 for supporting various control, state management, and driving of the vehicle 100, an intelligent transportation system (ITS) device 300 for receiving information from an ITS, various types of user devices, etc. The server 200 may be, for example, an external device operated by a vehicle manufacturer or provided to service autonomous driving and may receive connected data of the vehicle 100 or transmit data required for autonomous driving. To support autonomous driving and various services of the vehicle 100, the server 200 may transmit various pieces of information and software modules that are used for controlling the vehicle 100 to the vehicle 100 in response to the requests and pieces of data transmitted from the vehicle 100 and the user device.

The ITS device 300 is, for example, a road side unit (RSU) and may exchange vehicle recognition data, driving control and state data, environmental data near a vehicle, map data, or the like with the vehicle 100 through vehicle to infrastructure (V2I) to assist the user's driving or support the autonomous driving of the vehicle 100. The vehicle 100 may exchange the pieces of data listed above with another vehicle 400 through vehicle to vehicle (V2V) to support manual driving or autonomous driving.

The vehicle 100 may communicate with another vehicle or other devices based on cellular communication, wireless access in vehicular environment (WAVE) communication, dedicated short range communication (DSRC), short-range communication, or other communication methods.

For example, the vehicle 100 may use a communication network such as Long Term Evolution (LTE) or 5G, WiFi communication network, WAVE communication network, etc. as a cellular communication network to communicate with the server 200, the ITS device 300, and another vehicle 400. As an exemplary embodiment of the present disclosure, the DSRC, etc. used in the vehicle 100 may be used for communication between vehicles. A communication method between the vehicle 100, the server 200, the ITS device 300, another vehicle 400, and the user device is not limited to the above-described embodiment.

FIG. 2 is a view showing modules forming a vehicle 100 according to an exemplary embodiment of the present disclosure.

The vehicle 100 may include a sensor unit 102, a manipulation unit 106, a display 108, a load device 114, and a transceiver 112.

The sensor unit 102 may include various types of detectors for detecting various states and situations that occur in an external environment, internal system, user manipulation, and boarding space of the vehicle 100.

The sensor unit 102 may include an outer-facing camera 104a, a radio detection and ranging (RADAR) sensor 104b, a light detection and ranging (LiDAR) sensor 104c, and the like to detect dynamic and static objects that are present outside the vehicle 100. The camera 104a may detect an external object in video while being used in the vehicle 100 to generate video data and transmit the video data to the processor 122. The LiDAR sensor 104c may be configured to generate point cloud data as detected data for an external object and transmit the point cloud data to the processor 122 to generate three-dimensional spatial information that identifies at least the shape of the external object. The radar sensor 104b may emit radio waves of a specific frequency to a peripheral area of the vehicle 100 to identify the presence of an external object, a relative distance, speed, direction, and the like to generate radar data through radio waves reflected from the external object. In an exemplary embodiment of the present disclosure, the LiDAR sensor 104c is provided as an exemplary embodiment of the present disclosure, but in another example, the LiDAR sensor 104c may not be mounted.

The sensor unit 102 may include a positioning sensor 104d, a wheel sensor 104e, an attitude sensor 104f, and the like to check a position, speed, driving attitude, and the like of the vehicle. The attitude sensor 104f may include a gyro sensor, an angular velocity sensor, an acceleration sensor, or the like.

In an exemplary embodiment of the present disclosure, the sensors of the sensor unit 102 referred to in the description of the exemplary embodiment are mainly described, but sensors for detecting any situation, which are not listed above, may be additionally included.

The manipulation unit 106 may be configured as a module manipulated by a user for driving. For example, the manipulation unit 106 may be a steering wheel for manual driving, an automatic or manual transmission, an accelerator pedal, a brake pedal, or the like. The manipulation unit 106 may further include an interface for using, deactivating, and selecting detailed functions of an autonomous driving mode requested by the user so that the user may use the autonomous driving function. To receive various requests related to autonomous driving, the manipulation unit 106 may include, for example, a hard type interface provided at a predetermined position inside the vehicle 100 or a soft type interface which may be touched on the display 108. According to the specifications of the autonomous vehicle, at least one of the steering wheel, the transmission, and the pedals may be omitted. As an exemplary embodiment of the present disclosure, the manipulation unit 106 may include a module that receives a user's control request for the load device 114 in addition to driving control.

The display 108 is configured as a user interface. The display 108 may display an operation state of the vehicle 100, a control state, route/traffic information, the remaining energy information, a content requested by the driver, and the like to be output by the processor 122. Furthermore, the display 108 may be configured as a touch screen configured for detecting the driver's input to receive the driver's request that instructs the processor 122.

The load device 114 may be mounted on the vehicle 100 and may be a type of non-driving electric device excluding a driving power system such as the wheel driving unit 118. The load device 114 is an auxiliary device for receiving power from the energy generation unit 110 and may be, for example, any of various devices provided in an air conditioning system, a lighting system, a seat system, and the vehicle 100. In an exemplary embodiment of the present disclosure, a cooling/heating system for cooling or heating at least one of a battery, a fuel cell, an internal combustion engine, an air conditioning system, and a specific area of the vehicle 100 may be further included in the load device 114.

The transceiver 112 may support mutual communication with the server 200, the ITS device 300, the nearby vehicle 400, and the like. The transceiver 112 may include, for example, a module for processing cellular communication, WAVE, DSRC communication, or the like. In an exemplary embodiment of the present disclosure, the transceiver 112 may transmit data generated or stored while driving to the server 200 and receive a data and software module transmitted from the server 200. The transceiver 112 may support communication with an electronic device of a passenger inside the vehicle 100. In an exemplary embodiment of the present disclosure, the vehicle 100 may transmit and receive data used in the method according to an exemplary embodiment of the present disclosure with an external device through the transceiver 112.

Furthermore, the vehicle 100 may include the energy generation unit 110 and the actuating unit 116.

The energy generation unit 110 may be configured to generate and supply power and electric power that are used in a driving power system and a non-driving power system, such as the actuating unit 116. The non-driving power system may include, for example, the sensor unit 102, the manipulation unit 106, the display 108, the load device 114, the transceiver 112, and the like but is not limited thereto, and may include any of various components that implement sensing, interface, communication, and convenience functions other than components directly involved in a driving operation. When the vehicle 100 is driven based on electrical energy, the energy generation unit 110 may be configured as, for example, an electric battery charged from the outside thereof or configured as a combination of an electric battery and a fuel cell that charges the battery. In the case of a combination of the electric battery and the fuel cell, the energy generation unit 110 may include a tank that stores a material used to produce power for the fuel cell, for example, liquefied hydrogen. When the vehicle 100 is driven based on fossil energy, the energy generation unit 110 may be configured as an internal combustion engine. Furthermore, when the vehicle 100 is a hybrid type, the energy generation unit 110 may be provided as a combination of the internal combustion engine and the electric battery.

The actuating unit 116 may include at least one module that implements a driving operation and may perform at least one driving operation of longitudinal control such as acceleration and deceleration and lateral control such as steering according to a user request from the manipulation unit 106. To perform the driving operation according to the user's manual manipulation or the instruction of the processor 122 by autonomous driving, the actuating unit 116 may include the wheel driving unit 118, and a mechanical component and electronic module for implementing the driving operation of the wheel driving unit 118. When the vehicle 100 is operated based on electrical energy, the vehicle 100 may include an assembly for transmitting the requested driving operation to the wheel driving unit 118. When the vehicle 100 is operated based on fossil energy, the actuating unit 116 may include a transmission and a gear module for transmitting the power of an internal combustion engine.

The wheel driving unit 118 may include a plurality of wheels, a driving force generation module for generating and applying a driving force to wheels or transmitting the driving force, a braking module for decelerating the driving of the wheels, a steering module for achieving transverse control of the wheels. When the vehicle 100 is driven based on electrical energy, the driving force generation module may be configured as a motor assembly for generating a driving force based on power output from the electric battery. The braking module of the electricity-based vehicle 100 may further include a regenerative braking function.

The memory 120 may store an application and various pieces of data for controlling the vehicle 100 and load the application or read or write the data at the request of the processor 122.

The processor 122 may perform the overall control of the vehicle 100. The processor 122 may be configured to execute applications and instructions that are stored in the memory 120.

Figure 3:
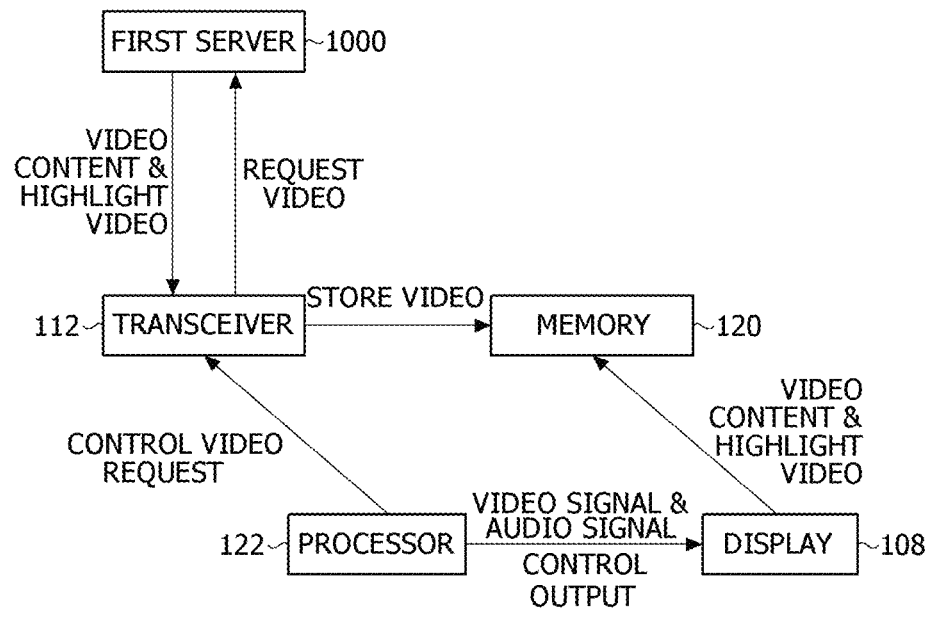
FIG. 3 is a view for describing an operation of a vehicle according to an exemplary embodiment of the present disclosure.

FIG. 3 is a view for describing an operation of a vehicle according to an exemplary embodiment of the present disclosure. Referring to FIG. 2 and FIG. 3, the transceiver 112 may communicate with a first server 1000 to receive and store a highlight video in the memory 120.

For example, the transceiver 112 may receive the highlight video from the first server 1000 according to a preset cycle and store the highlight video in the memory 120. The preset cycle may be set in advance according to the driving environment, communication state with the first server 1000, or the like of the vehicle and may be changed or updated.

Alternatively, the transceiver 112 may request the transmission of the highlight video to the first server 1000 at a time point when the vehicle stops according to the request of the processor 122 and receive and store a highlight video corresponding to the transmission request from the first server 1000 in the memory 120.

Alternatively, the transceiver 112 may transmit highlight request information including predicted stop information and missing video section information during a driving period of the vehicle to the first server 1000 and receive and store a highlight video corresponding to the highlight transmission request from the first server 1000 in the memory 120. The missing video section information may refer to a section in which a video signal of the video content may not be output while the vehicle travels.

Furthermore, the transceiver 112 may collect traffic situation information including traffic sensors, cameras, Global Positioning System (GPS) data, traffic light information, and the like from a traffic management system or a traffic signal controller.

The stopped state of the vehicle may be a state in which the vehicle is stopped without exceeding a specific time, and the driving state may be a state in which the vehicle is moving without stopping. However, in an exemplary embodiment of the present disclosure, the stopped period of the vehicle is defined as a time of several seconds or more and several minutes or less to secure a predetermined time period for playing the highlight video.

The first server 1000 may select the highlight of the video content, generate highlight videos at predetermined time intervals, and provide the highlight videos to the vehicle. The first server 1000 may be a server that produces video content itself or may be a server that receives video content from a server that produces video content and generates only a highlight video.

The first server 1000 may collect an original video of the video content. The original video may be a recorded video or real-time streaming video of the entire video content. The first server 1000 may partition the collected video into a predetermined time interval or an event unit and extract a specific frame to identify a key moment. The first server 1000 may use a deep learning algorithm or model to detect an important event. For example, the first server 1000 may identify a key moment through object detection, motion recognition, or the like or analyze the cheers of the audience, a change in tone of the commentator, or the like to identify an important moment or use metadata (e.g., timestamp or event log) attached to the video content to identify a key moment.

The first server 1000 may be configured to generate a short clip based on the detected key moment, add transition for natural transition between clips, and remove an unnecessary portion. Furthermore, the first server 1000 may be configured to generate a highlight video by adding an effect such as slow motion or zoom-in/zoom-out or adding music and narration. Finally, the first server 1000 may apply color correction and a filter for visual consistency of the highlight video and render and store the generated highlight video in any of various formats.

The display 108 may output at least one of a video signal and an audio signal of the video content. In an exemplary embodiment of the present disclosure, the display 108 may include advanced vehicle navigation and telematics (AVNT). The AVNT is a term referring to an information and entertainment system in a vehicle and may be a system that integrates navigation, audio, video, and communication functions.

The display 108 may output only the audio signal of the video content when the vehicle travels under the control of the processor 122 and output the video signal and audio signal of the video content when the vehicle is stopped.

Furthermore, the display 108 may receive and play the video content in real time from an external server through a streaming service under the control of the processor 122. The external server may be the first server 1000.

The processor 122 may be configured to determine whether the vehicle travels, receive a highlight video corresponding to a first period in which the vehicle was in a traveling state from the first server 1000, and control the display 108 to play the highlight video during a second period which is a stopped state of the vehicle.

The processor 122 may be configured to determine the traveling state of the vehicle using data measured by the positioning sensor 104*d*, the wheel sensor 104*c*, and the attitude sensor 104*f*. For example, the processor 122 may be configured to determine that the vehicle is in a stopped state when the vehicle does not move for a preset time or more using a gyro sensor, an angular velocity sensor, and an acceleration sensor of the attitude sensor. Here, the preset time may be set in units of several seconds. The processor 122 may be configured to determine that the time for which the vehicle maintains a stopped state is the second period and determine that the time for which the vehicle maintains a traveling state rather than the stopped state is the first period.

The processor 122 may be configured for controlling the display 108 to play the video content which is stored in the memory 120 or received from the first server 1000. The processor 122 may stop the video signal output of the video content during the first period in which the vehicle travels. At the instant time, the processor 122 may be configured for controlling the display 108 to output only the audio signal of the video content during the first period.

Furthermore, the processor 122 may be configured for controlling the display 108 to play the video signal and audio signal of the video content during the second period in which the vehicle is stopped. At the instant time, the processor 122 may be configured for controlling the display 108 to play the highlight video.

When it is determined that the vehicle is stopped, the processor 122 may request the transmission of the highlight video to the first server 1000 through the transceiver 112. At the instant time, the processor 122 may transmit the missing video section information together during the first period in which the vehicle was traveling to request the transmission of the highlight video corresponding to the missing video section. When the stopped state of the vehicle ends, the processor 122 may request the first server 1000 to stop transmitting the highlight video through the transceiver 112. At the instant time, the processor 122 may transmit an end time point of the highlight video played through the display 108 during the second period together to the first server 1000.

Alternatively, the processor 122 may be configured to generate predicted stop information including a predicted stop point, a predicted stop start time, and a predicted stop end time of the vehicle using traveling information and traffic situation information of the vehicle.

The processor 122 may be configured to generate predicted stop information using traffic situation information collected through the transceiver 112 and vehicle traveling information received from electronic components in the vehicle. The vehicle traveling information may include data such as a current position, speed, acceleration, direction, destination, and the like of the vehicle and may be collected from a Global Positioning System (GPS) system, an on-board diagnostics (OBD)-II, or a telematics device in the vehicle.

The processor 122 may synchronize the traffic situation information with the vehicle traveling information based on time and position and then analyze a traffic density by road section to evaluate congestion and detect events such as traffic accidents, construction sections, and traffic light patterns to evaluate the influence on traveling.

Therefore, the processor 122 may be configured to predict future traffic situations using a machine learning model or simulation. The processor 122 reflects real-time traffic situation information to determine an optimal route to the destination of the vehicle input into a navigation device. The processor 122 analyzes a traveling pattern (e.g., acceleration, deceleration, or stop frequency) of the vehicle to evaluate the possibility of stop.

The processor 122 may identify sections with high traffic density, traffic lights, intersections, and the like on a traveling route and determine the probability of stop at each point. The processor 122 may be configured to determine the probability of stop of the vehicle at each point based on a current speed, traffic density, and traveling pattern of the vehicle. The processor 122 may select a point exceeding a specific probability as a predicted stop point.

The processor 122 may be configured to determine the time at which the vehicle is predicted to stop when traveling at the current speed at the predicted stop point. For example, the processor 122 may be configured to determine a predicted stop start time according to Equation 1 below:

$$t_{start} = t_{current} + \frac{d_{stop} - d_{current}}{v_{current}} \qquad \text{[Equation 1]}$$

In Equation 1, $t_{start}$ denotes a predicted stop start time, $t_{current}$ denotes a current time, $d_{stop}$ denotes a predicted stop point, $d_{current}$ denotes a current position, and $v_{current}$ denotes a current speed.

Furthermore, the processor 122 may reflect a signal waiting time, congestion time, and the like that reflect traffic situation information from the predicted stop start time to determine a predicted stop end time.

The processor 122 may be configured to generate highlight request information including predicted stop information and missing video section information during the first period. The processor 122 may request the transmission of the highlight video to the first server 1000 through the transceiver 112 at a predetermined time period before the predicted stop start time of the vehicle. The processor 122 may be configured to generate missing video section information according to the predicted stop information and request the transmission of the highlight video corresponding to the missing video section together with the highlight request information. At the instant time, the processor 122 may request the highlight video with a playable length during the second period in which stop is predicted according to the predicted stop end time. When the stopped state of the vehicle ends, the processor 122 may request the first server 1000 to stop transmitting the highlight video through the transceiver 112. At the instant time, the processor 122 may transmit an end time point of the highlight video played through the display 108 during the second period together to the first server 1000.

Figure 4:
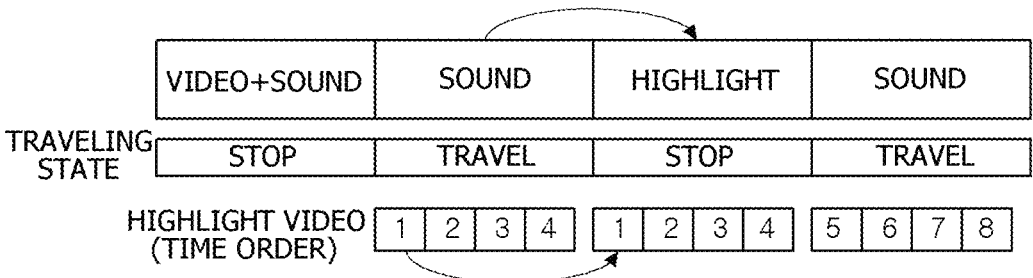
FIG. 4, FIG. 5 and FIG. 6 are views for describing an operation of a processor according to an exemplary embodiment of the present disclosure.
Figure 5:
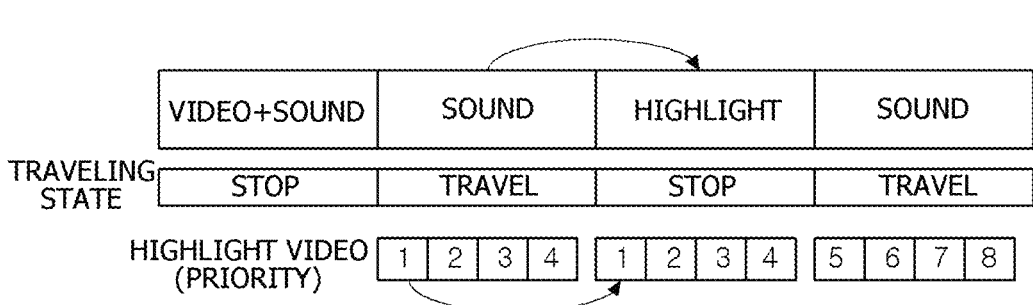
Figure 6:
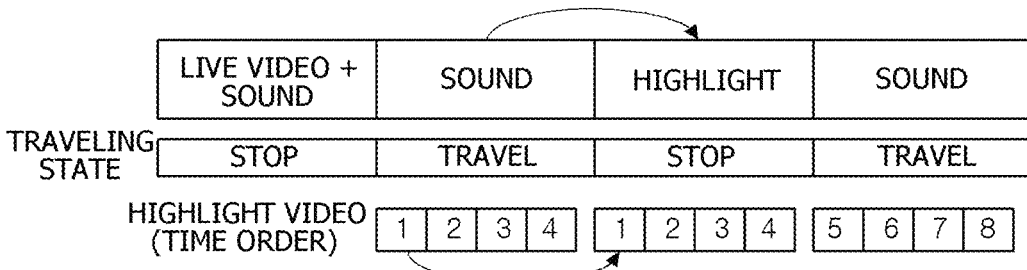

FIG. 4, FIG. 5 and FIG. 6 are views for describing an operation of a processor according to an exemplary embodiment of the present disclosure.

Referring to FIG. 4 together, the processor 122 may be configured for controlling the display 108 to sequentially play highlight videos stored in the memory 120 in time order. The processor 122 may select a highlight video corresponding to the missing video section and control the display 108 to sequentially play the highlight videos during the second period.

Referring to FIG. 5 together, the processor 122 may be configured for controlling the display 108 to sequentially play the highlight videos stored in the memory 120 in an order of higher priority. At the instant time, the processor 122 may set priority according to at least one of the popularity, preference, and play time of the highlight video.

For example, the processor 122 may be configured for controlling the display 108 so that the highlight videos are played sequentially in an order of higher popularity during the second period. The first server 1000 may be configured to determine popularity using the number of times the highlight video is played, evaluation scores, and the like and provide a highlight video including popularity information.

For example, the processor 122 may be configured for controlling the display 108 to sequentially play the highlight videos in an order of higher preference of vehicle passengers during the second period. The preference may be set according to information set in advance by the vehicle driver or passenger.

For example, the processor 122 may be configured for controlling the display 108 to sequentially play the highlight videos of which play times are most similar to a predicted stop period of the vehicle. The predicted stop time may be determined according to the above-described predicted stop start time and predicted stop end time.

Referring to FIG. 6 together, the processor 122 may be configured for controlling the display 108 to play a highlight video of live video content during the second period during the first period in which the vehicle travels. When the live video starts in a stopped state of the vehicle, the processor 122 is configured to control the display 108 to output a video signal and an audio signal of the live video content.

Next, when the vehicle switches to a traveling state, the processor 122 is configured to control the display 108 to stop outputting the video signal of the live video content and output only the audio signal.

The processor 122 receives the highlight video from the first server 1000 through the transceiver 112 and when the vehicle is in a stopped state, controls the display 108 to play the highlight video of the live video content. At the instant time, the video signal and audio signal of the highlight video may be output.

When the vehicle switches back to the traveling state, the processor 122 is configured to control the display 108 to stop outputting the video signal of the live video content and output only the audio signal.

Figure 7:
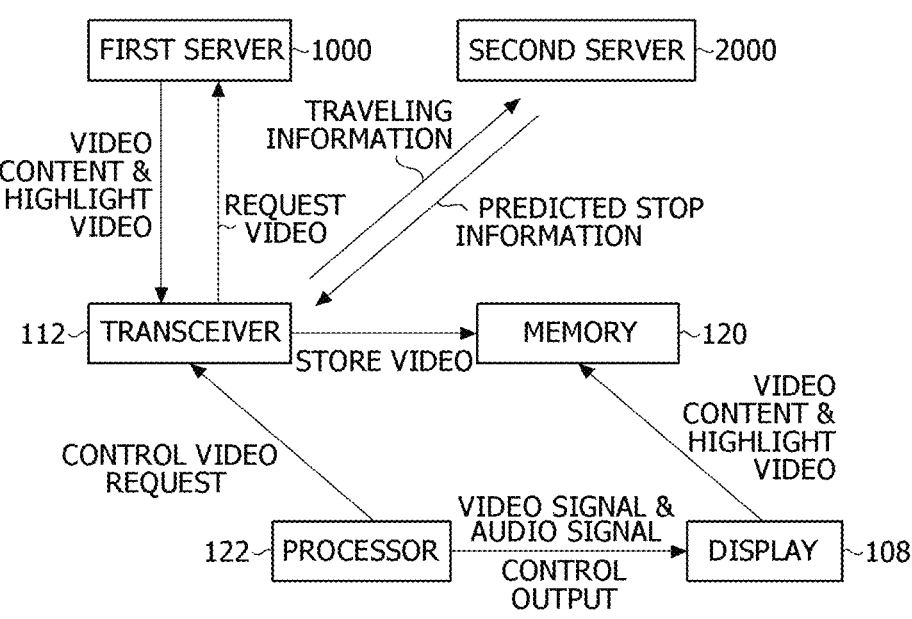
FIG. 7 is a view for describing an operation of a vehicle according to another exemplary embodiment of the present disclosure.

FIG. 7 is a view for describing an operation of a vehicle according to another exemplary embodiment of the present disclosure.

In FIG. 7, the transceiver 112 may transmit the traveling information of the vehicle to a second server 2000 under the control of the processor 122.

The second server 2000 may be a vehicle navigation server. The second server 2000 may perform functions of guiding a real-time route, providing traffic information, and managing map data. The second server 2000 may be operated based on a cloud and may perform functions of determining a route, searching an optimal route, providing real-time traffic information, collecting a traffic situation, analyzing the traffic situation, forecasting traffics, and managing map data.

Furthermore, the second server 2000 may be configured to determine predicted stop information including a predicted stop point, a predicted stop start time, and a predicted stop end time of the vehicle using traveling information and traffic situation information. The second server 2000 may be configured to determine the predicted stop point, the predicted stop start time, and the predicted stop end time of the vehicle in the same manner as the above-described calculation method of the processor 122.

The transceiver 112 may receive and transmit the predicted stop point, the predicted stop start time, and the predicted stop end time of the vehicle from the second server 2000 to the processor 122.

The processor 122 may be configured to generate highlight request information including predicted stop information and missing video section information during the first period. The processor 122 may request the transmission of the highlight video to the first server 1000 through the transceiver 112 at a predetermined time period before the predicted stop start time of the vehicle. The processor 122 may be configured to generate missing video section information according to the predicted stop information and request the transmission of the highlight video corresponding to the missing video section together with the highlight request information. At the instant time, the processor 122 may request the highlight video with a playable length during the second period in which stop is predicted according to the predicted stop end time. When the stopped state of the vehicle ends, the processor 122 may request the first server 1000 to stop transmitting the highlight video through the transceiver 112. At the instant time, the processor 122 may transmit to the first server 1000, an end time point of the highlight video played through the display 108 during the second period together.

FIG. 8 is a flowchart of a method for controlling a vehicle according to an exemplary embodiment of the present disclosure.

Referring to FIG. 8, the transceiver receives a highlight video from the first server according to a preset cycle and stores the highlight video in the memory. The preset cycle may be set in advance according to a traveling environment, communication state with the first server, and the like of the vehicle and may be changed or updated (S801).

Next, the processor is configured to determine whether the vehicle travels. The processor is configured to determine that the time for which the vehicle maintains the stopped state is a second period and the time for which the vehicle maintains the traveling state rather than the stopped state is a first period (S802).

Next, the processor is configured to control the display to stop outputting the video signal of the video content when the vehicle is in the traveling state (S803).

Alternatively, when the vehicle is in the stopped state, the processor is configured to control the display to play the highlight video corresponding to the first period in which the vehicle was in the traveling state during the second period in which the vehicle is in the stopped state (S804).

Next, when the vehicle ends the stopped state, the processor is configured to control the display to stop outputting the video signal of the video content and requests the first server to stop transmitting the highlight video through the transceiver. At the instant time, the processor is configured to transmit the end time of the highlight video played through the display during the second period to the first server together (S805, S806).

FIG. 9 is a flowchart of a method for controlling a vehicle according to another exemplary embodiment of the present disclosure.

Referring to FIG. 9, the processor is configured to determine whether the vehicle travels. The processor is configured to determine that the time for which the vehicle maintains the stopped state is a second period and the time for which the vehicle maintains the traveling state rather than the stopped state is a first period (S901).

Next, the processor is configured to control the display to stop outputting the video signal of the video content when the vehicle is in the traveling state (S902).

Alternatively, when it is determined that the vehicle is stopped, the processor is configured to request the first server to transmit the highlight video through the transceiver. At the instant time, the processor is configured to transmit the missing video section information together during the first period in which the vehicle was traveling to request the transmission of the highlight video corresponding to the missing video section (S903).

Next, the transceiver receives and stores the highlight video corresponding to the missing video section from the first server in the memory (S904).

Next, the processor is configured to control the display to play the highlight video corresponding to the first period in which the vehicle was in the traveling state during the second period when the vehicle is in the stopped state (S905).

Next, when the vehicle ends the stopped state, the processor is configured to control the display to stop outputting the video signal of the video content and requests the first server to stop transmitting the highlight video through the transceiver. At the instant time, the processor is configured to transmit the end time of the highlight video played through the display during the second period to the first server together (S906, S907).

FIG. 10 is a flowchart of a method for controlling a vehicle according to yet another exemplary embodiment of the present disclosure.

Referring to FIG. 10, the processor is configured to determine whether the vehicle travels. The processor is configured to determine that the time for which the vehicle maintains the stopped state is a second period and the time for which the vehicle maintains the traveling state rather than the stopped state is a first period (S1001).

Alternatively, when the vehicle is in the stopped state, the processor is configured to control the display to play the highlight video corresponding to the first period in which the vehicle was in the traveling state during the second period in which the vehicle is in the stopped state (S1002).

Alternatively, the processor is configured to control the display to stop outputting the video signal of the video content when the vehicle is in the traveling state (S1003).

When the vehicle is in the traveling state, the processor is configured to generate predicted stop information including a predicted stop point, a predicted stop start time, and a predicted stop end time of the vehicle using the traveling information and traffic situation information of the vehicle (S1004).

Next, the processor is configured to generate highlight request information including the predicted stop information and the missing video section information during the first period (S1005).

Next, the processor is configured to request the first server to transmit the highlight video through the transceiver at a predetermined time period before the predicted stop start time of the vehicle. The processor is configured to generate the missing video section information according to the predicted stop information and request the transmission of the highlight video corresponding to the missing video section together with the highlight request information (S1006).

Next, the processor is configured to determine whether the vehicle travels (S1007).

When the vehicle maintains the traveling state, the processor is configured to control the display to stop outputting the video signal of the video content (S1008).

Next, when the vehicle is in the stopped state, the processor is configured to control the display to play the highlight video corresponding to the first period in which the vehicle was in the traveling state during the second period in which the vehicle is in the stopped state (S1009).

Next, when the vehicle end portions the stopped state, the processor is configured to control the display to stop outputting the video signal of the video content and requests the first server to stop transmitting the highlight video through the transceiver. At the instant time, the processor is configured to transmit the end time of the highlight video played through the display during the second period to the first server together (S1010, S1011).

The term "~unit" used in an exemplary embodiment of the present disclosure means a software or hardware component such as a field-programmable gate array (FPGA) or an ASIC, and the "~unit" is configured to perform certain roles. However, the "unit" is not limited to software or hardware. The "unit" may be configured to be disposed in an addressable storage medium and configured to reproduce one or more processors. Therefore, as an exemplary embodiment of the present disclosure, the "unit" is components such as software components, object-oriented software components, class components, and task components, processes, functions, attributes, procedures, subroutines, segments of program code, drivers, firmware, microcode, circuits, data, database, data structures, tables, arrays, and variables. Functions provided in the components and "~units" may be combined into the smaller number of components and "unit" or separated into additional components and "units." Additionally, the components and "~units" may be implemented to reproduce one or more CPUs in a device or a security multimedia card.

According to a vehicle and a method for controlling the same according to an exemplary embodiment of the present disclosure, a highlight video of a video which is not watched while driving may be provided when a vehicle is stopped.

Therefore, it is possible to improve a driver's understanding of a video of a video streaming service.

Therefore, video streaming services in vehicles may be actively used.

Furthermore, it is possible to provide a driver with a continuous atmospheric watching function when watching live video content.

Furthermore, it is possible to secure the safety of a vehicle driver by operating the output of the video content in a limited manner according to a traveling state of the vehicle.

Software implementations may include software components (or elements), object-oriented software components, class components, task components, processes, functions, attributes, procedures, subroutines, program code segments, drivers, firmware, microcode, data, database, data structures, tables, arrays, and variables. The software, data, and the like may be stored in memory and executed by a processor. The memory or processor may employ a variety of means well-known to a person including ordinary knowledge in the art.

Furthermore, the terms such as "unit", "module", etc. included in the specification mean units for processing at least one function or operation, which may be implemented by hardware, software, or a combination thereof.

In the flowchart described with reference to the drawings, the flowchart may be performed by the controller or the processor. The order of operations in the flowchart may be changed, a plurality of operations may be merged, or any operation may be divided, and a specific operation may not be performed. Furthermore, the operations in the flowchart may be performed sequentially, but not necessarily performed sequentially. For example, the order of the operations may be changed, and at least two operations may be performed in parallel.

Hereinafter, the fact that pieces of hardware are coupled operatively may include the fact that a direct and/or indirect connection between the pieces of hardware is established by wired and/or wirelessly.

In an exemplary embodiment of the present disclosure, the vehicle may be referred to as being based on a concept including various means of transportation. In some cases, the vehicle may be interpreted as being based on a concept including not only various means of land transportation, such as cars, motorcycles, trucks, and buses, that drive on roads but also various means of transportation such as airplanes, drones, ships, etc.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The term "and/or" may include a combination of a plurality of related listed items or any of a plurality of related listed items. For example, "A and/or B" includes all three cases such as "A", "B", and "A and B".

In exemplary embodiments of the present disclosure, "at least one of A and B" may refer to "at least one of A or B" or "at least one of combinations of at least one of A and B". Furthermore, "one or more of A and B" may refer to "one or more of A or B" or "one or more of combinations of one or more of A and B".

In the present specification, unless stated otherwise, a singular expression includes a plural expression unless the context clearly indicates otherwise.

In the exemplary embodiment of the present disclosure, it should be understood that a term such as "include" or "have" is directed to designate that the features, numbers, steps, operations, elements, parts, or combinations thereof described in the specification are present, and does not preclude the possibility of addition or presence of one or more other features, numbers, steps, operations, elements, parts, or combinations thereof.

According to an exemplary embodiment of the present disclosure, components may be combined with each other to be implemented as one, or some components may be omitted.

The foregoing descriptions of specific exemplary embodiments of the present disclosure have been presented for purposes of illustration and description. They are not intended to be exhaustive or to limit the present disclosure to the precise forms disclosed, and obviously many modifications and variations are possible in light of the above teachings. The exemplary embodiments were chosen and described in order to explain certain principles of the invention and their practical application, to enable others skilled in the art to make and utilize various exemplary embodiments of the present disclosure, as well as various alternatives and modifications thereof. It is intended that the scope of the present disclosure be defined by the Claims appended hereto and their equivalents.

What is claimed is:

1. A vehicle comprising:
   a transceiver configured to perform communication with a first server;
   a display configured to output at least one of a video signal and an audio signal of video content; and
   a processor operatively connected to the transceiver and the display and configured to determine whether the vehicle travels, receive one or more highlight videos corresponding to a first period in which the vehicle was in a traveling state from the first server, and control the display to play the one or more highlight videos during a second period in which the vehicle is in a stopped state;
   wherein the processor is further configured to generate predicted stop information including a predicted stop point, a predicted stop start time, and a predicted stop end time of the vehicle using traveling information and traffic situation information of the vehicle;
   wherein the processor is further configured to generate highlight request information including the predicted stop information and missing video section information during the first period.

2. The vehicle of claim 1, wherein the processor is further configured to control the display to stop outputting the video signal of the video content during the first period in response that the vehicle is traveling and to play the video signal and the audio signal of the one or more highlight videos during the second period in which the vehicle is stopped.

3. The vehicle of claim 1, wherein the transceiver receives the one or more highlight videos from the first server according to a preset cycle and stores the one or more highlight videos in a memory operatively connected to the processor.

4. The vehicle of claim 1, wherein the transceiver receives the one or more highlight videos from the first server at a time point when the vehicle is stopped according to a request of the processor and stores the one or more highlight videos in a memory operatively connected to the processor.

5. The vehicle of claim 1, wherein the transceiver receives the one or more highlight videos corresponding to the highlight request information from the first server and stores the one or more highlight videos in a memory operatively connected to the processor.

6. The vehicle of claim 1, wherein the processor is further configured to control the display to sequentially play the one or more highlight videos stored in a memory operatively connected to the processor, in time order.

7. The vehicle of claim 1, wherein the processor is further configured to control the display to sequentially play the one or more highlight videos stored in a memory in order of higher priority.

8. The vehicle of claim 7, wherein the processor is further configured to set the priority according to at least one of popularity, preference, and playing time of the one or more highlight videos.

9. The vehicle of claim 1, wherein the transceiver transmits traveling information of the vehicle to a second server and receives predicted stop information including a predicted stop point, a predicted stop start time, and a predicted stop end time of the vehicle that are determined using the traveling information and traffic situation information from the second server.

10. A method for controlling a vehicle, the method comprising:
    determining, by a processor, whether the vehicle travels; and
    controlling, by the processor, a display operatively connected to the processor to play one or more highlight videos corresponding to a first period in which the vehicle was in a traveling state during a second period in which the vehicle is in a stopped state in response that the vehicle is stopped;
    wherein the determining of whether the vehicle travels further includes generating, by the processor, predicted stop information including a predicted stop point, a predicted stop start time, and a predicted stop end time of the vehicle using traveling information and traffic situation information of the vehicle;
    wherein the determining of whether the vehicle travels further includes generating, by the processor, highlight request information including the predicted stop information and missing video section information during the first period.

11. The method of claim 10, further including controlling, by the processor, the display to stop outputting a video signal of video content in response that the vehicle is traveling.

12. The method of claim 10, further including, before the determining of whether the vehicle travels, receiving, by a transceiver operatively connected to the processor, the one or more highlight videos from a first server according to a preset cycle and storing the one or more highlight videos in a memory operatively connected to the processor.

13. The method of claim 10, further including, after the determining of whether the vehicle travels, receiving, by a transceiver operatively connected to the processor, the one or more highlight videos from a first server at a time point when the vehicle is stopped according to a request of the processor and storing the one or more highlight videos in a memory operatively connected to the processor.

14. The method of claim 10, further including, after the determining of whether the vehicle travels, receiving, by a transceiver, the one or more highlight videos corresponding to the highlight request information from a first server and storing the one or more highlight videos in a memory operatively connected to the processor.

15. The method of claim 10, wherein the controlling of the display includes controlling, by the processor, the display to sequentially play the one or more highlight videos stored in a memory operatively connected to the processor, in time order.

16. The method of claim 10, wherein the controlling of the display includes controlling, by the processor, the display to sequentially play the one or more highlight videos stored in a memory operatively connected to the processor, in order of higher priority.

* * * * *